United States Patent
Tsuji

(10) Patent No.: US 8,537,230 B2
(45) Date of Patent: Sep. 17, 2013

(54) IMAGING APPARATUS, AN IMAGING METHOD, A REPRODUCING APPARATUS, A REPRODUCING METHOD AND A PROGRAM

(75) Inventor: Kanae Tsuji, Chiba (JP)

(73) Assignee: Sony Corporation, Tokyo (JP)

( * ) Notice: Subject to any disclaimer, the term of this patent is extended or adjusted under 35 U.S.C. 154(b) by 599 days.

(21) Appl. No.: 11/984,814

(22) Filed: Nov. 21, 2007

(65) Prior Publication Data

US 2008/0136919 A1   Jun. 12, 2008

(30) Foreign Application Priority Data

Dec. 12, 2006   (JP) ................................. 2006-334517

(51) Int. Cl.
*H04N 5/228* (2006.01)

(52) U.S. Cl.
USPC ................ 348/222.1; 348/231.99; 348/231.3; 348/231.6; 348/333.01; 348/333.02

(58) Field of Classification Search
USPC ............... 348/333.01, 333.02, 231.3, 231.99, 348/222.1, 231.6
See application file for complete search history.

(56) References Cited

U.S. PATENT DOCUMENTS

| | | | |
|---|---|---|---|
| 2002/0136531 A1* | 9/2002 | Harradine et al. | 386/69 |
| 2003/0081266 A1* | 5/2003 | Seaman et al. | 358/474 |
| 2004/0201685 A1* | 10/2004 | Seaman et al. | 348/207.1 |
| 2004/0201735 A1* | 10/2004 | Baron | 348/231.2 |
| 2006/0268121 A1* | 11/2006 | Watanabe | 348/231.2 |
| 2009/0003794 A1* | 1/2009 | Heatherly et al. | 386/52 |

FOREIGN PATENT DOCUMENTS

| | | |
|---|---|---|
| JP | 2003-078868 A | 3/2003 |
| JP | 2003-242089 A | 8/2003 |
| JP | 2004-207789 A | 7/2004 |
| JP | 2005-026752 A | 1/2005 |
| JP | 2005-086237 A | 3/2005 |
| JP | 2006-074406 A | 3/2006 |
| JP | 2006-173985 | 6/2006 |
| JP | 2006-332789 A | 12/2006 |

OTHER PUBLICATIONS

Japanese Office Action issued Apr. 19, 2011 for corresponding Japanese Application No. 2006-334517.
Japanese Office Action issued Feb. 7, 2012 for corresponding Japanese Application No. 2006-334517.
Japanese Office Action issue Apr. 24, 2012 for corresponding Japanese Application No. 2006-334517.

* cited by examiner

*Primary Examiner* — Antoinette Spinks
(74) *Attorney, Agent, or Firm* — Rader, Fishman & Grauer PLLC

(57) ABSTRACT

An imaging apparatus is disclosed. The imaging apparatus includes: an imaging part; and an imaging control unit for instructing a user to take a predetermined target subject to store a resulted image taken by the imaging part in accordance with the instruction on a recording medium.

6 Claims, 13 Drawing Sheets

| SCENE P | TARGET SUBJECT W |
|---|---|
| CEREMONY HALL APPEARANCE P1 | CHAPEL W1-1<br>BELL W1-2<br>VIRGIN ROAD W1-3<br>FLOWERS IN THE CHAPEL W1-4<br>⋮ |
| BRIDE ROOM P2 | BRIDE W2-1<br>PARENTS W2-2<br>ENTIRE ROOM W2-3<br>⋮ |
| INSIDE THE CEREMONY HALL P3 | BRIDE AND GROOM WHEN ENTER W3-1<br>ATTENDEES W3-2<br>TABLES W3-3<br>⋮ |
| ⋮ | ⋮ |

FIG. 6

| CEREMONY HALL APPEARANCE CHAPEL | CEREMONY HALL APPEARANCE BELL | CEREMONY HALL APPEARANCE VIRGIN ROAD |
|---|---|---|
| CEREMONY HALL APPEARANCE FLOWERS IN THE CHAPEL | BRIDE ROOM BRIDE | BRIDE ROOM PARENTS |
| BRIDE ROOM ENTIRE ROOM | INSIDE THE CEREMONY HALL BRIDE AND GROOM WHEN ENTER | INSIDE THE CEREMONY HALL TABLES |

21B

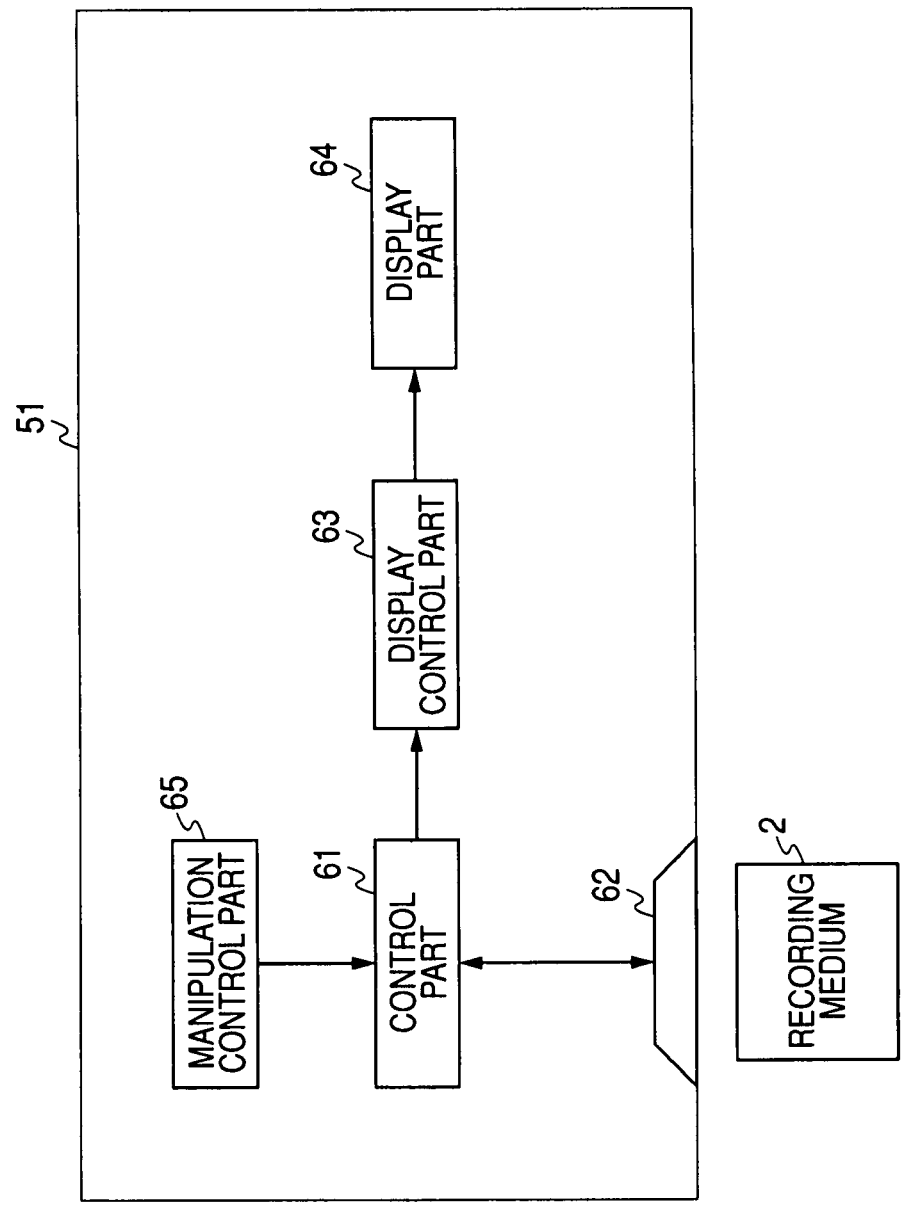

FIG. 11

| CEREMONY HALL APPEARANCE | ☐ CHAPEL<br>☐ BELL<br>☐ VIRGIN ROAD<br>☐ FLOWERS IN THE CHAPEL<br>⋮ |
|---|---|
| BRIDE ROOM | ☐ BRIDE<br>☐ PARENTS<br>☐ ENTIRE ROOM<br>⋮ |
| INSIDE THE CEREMONY HALL | ☐ BRIDE AND GROOM WHEN ENTER<br>☐ ATTENDEES<br>☐ TABLES<br>⋮ |

21C

IMAGING APPARATUS, AN IMAGING METHOD, A REPRODUCING APPARATUS, A REPRODUCING METHOD AND A PROGRAM

CROSS REFERENCES TO RELATED APPLICATIONS

The present invention contains subject matter related to Japanese Patent Application JP 2006-334517 filed in the Japanese Patent Office on Dec. 12, 2006, the entire contents of which being incorporated herein by reference.

BACKGROUND OF THE INVENTION

1. Field of the Invention

The present invention relates to an imaging apparatus, an imaging method, a reproducing apparatus, a reproducing method and a program, particularly to an imaging apparatus, an imaging method, a reproducing apparatus, a reproducing method and a program which takes a predetermined subject and stores or reproduces the taken image.

2. Description of the Related Art

There is a digital camera which converts video into electric signals and stores them as digital data on a recording medium such as a flash memory, using a semiconductor device such as a CCD (Charge Coupled Device Image Sensor) and a CMOS (Complementary Metal Oxide Semiconductor) that responds to lights.

The digital camera has such advantages that images are readily edited so that a taken image can be deleted anytime, images are readily treated so that a taken image is stored as data on a recording medium and handed to a person, and various reproduction forms are provided such as reproduction by a slide show in which images stored on a recording medium can be automatically reproduced in a determined order.

In addition, JP-A-2006-173985 (Patent Reference 1) describes an image reproduction system that stores image data imaged by a digital camera in a large capacity of a storage part and reads and displays image data stored in the storage part in response to signals from a remote controller in which when a slide show button of the remote controller is turned on, a target album for reproduction is read to start display a slide show of images contained in the album, and when an album switch button is turned on during the slide show, the album is switched to a specified album, and then a slide show of the new album after switched is performed.

SUMMARY OF THE INVENTION

The digital camera has advantages described above. However, on the recording medium, images taken by a user are stored in order of images in the scenes taken by the user as he/she wishes to take. Therefore, depending on subjects taken by the user and the order of taking the subjects, for example, in the case in which images are reproduced by a slide show, there is sometimes no plot and it is difficult for viewers to enjoy the show.

It is possible to edit images after the images are taken, but for example, in the case in which the scenes of a wedding are taken, editing itself is useless unless otherwise such scenes are taken that depict scenes of the appearance of a ceremony hall, scenes in a bride room, scenes inside the ceremony hall, and scenes in the wedding.

In addition, with a wide spread of inexpensive recording media on which data is undeleted once written, it is increasing that recording media on which taken images are recorded are handed after a wedding, and in this case, there is little time to edit the images.

In other words, as described above, although it is desirable that certain scenes are taken in a predetermined order at the first place depending on an event, no methods have been developed for implementing this imaging before.

Thus, it is desirable to take certain subjects for respective events.

An imaging apparatus according to an embodiment of the invention is an imaging apparatus including: an imaging part; and an imaging control means for instructing a user to take a predetermined target subject to store a resulted image taken by the imaging part in accordance with the instruction on a recording medium.

The imaging control means may instruct a user to take a plurality of target subjects in a predetermined order, and store a resulted image taken by the imaging part in accordance with the instruction on a recording medium.

The imaging control means may instruct a user to take a target subject in accordance with an event at every event.

The imaging control means may selectably represent a plurality of target subjects to take, and when a target subject to take is selected, the imaging control means may store a resulted image taken by the imaging part in accordance with the choice on the recording medium.

The imaging control means may store the taken image on the recording medium in order of being taken.

The imaging control means may associate the taken image with identification information of the target subject, and store it on the recording medium.

An imaging method according to an embodiment of the invention is an imaging method including the step of: controlling imaging in which a user is instructed to take a predetermined target subject to store a resulted image taken by the imaging part in accordance with the instruction on a recording medium.

A program according to an embodiment of the invention is a program which allows a computer to execute an imaging process including the step of: controlling imaging in which a user is instructed to take a predetermined target subject to store a resulted image taken by the imaging part in accordance with the instruction on a recording medium.

In the imaging apparatus, the imaging method, or the program according to the embodiments of the invention, a user is instructed to take a predetermined target subject, and a resulted image taken by the imaging part in accordance with the instruction is stored on a recording medium.

A reproducing apparatus according to an embodiment of the invention is a reproducing apparatus which reproduces a taken image stored on a recording medium of an imaging apparatus having an imaging part; and an imaging control means for instructing a user to take a predetermined target subject to store a resulted image taken by the imaging part in accordance with the instruction on a recording medium, the reproducing apparatus including: a reproducing means for reproducing the taken image stored on the recording medium in order of being stored on the recording medium.

In the imaging apparatus, in the case in which the taken image is stored as it is associated with identification information of the target subject, the reproducing means may reproduce the taken image associated with the identification information in order of target subjects identified by the identification information.

A reproducing method according to an embodiment of the invention is a reproducing method of reproducing a taken image stored on a recording medium of an imaging apparatus having an imaging part; and an imaging control means for instructing a user to take a predetermined target subject to store a resulted image taken by the imaging part in accordance with the instruction on a recording medium, the reproducing method including the step of: reproducing the taken image stored on the recording medium in order of being stored on the recording medium.

A program according to an embodiment of the invention is a program which allows a computer to execute a reproducing process of reproducing a taken image stored on a recording medium of an imaging apparatus having an imaging part; and an imaging control means for instructing a user to take a predetermined target subject to store a resulted image taken by the imaging part in accordance with the instruction on a recording medium, the process including the step of: reproducing the taken image stored on the recording medium in order of being stored on the recording medium.

In the reproducing apparatus, the reproducing method, or the program according to the embodiments of the invention, in the case in which a taken image is reproduced that is stored on a recording medium of an imaging apparatus having an imaging part; and an imaging control means for instructing a user to take a predetermined target subject to store a resulted image taken by the imaging part in accordance with the instruction on a recording medium, the taken image stored on the recording medium is reproduced in order of being stored on the recording medium.

According to the embodiments of the invention, a predetermined subject can be taken at every event, for example.

According to the embodiments of the invention, the resulted image by taking a predetermined subject can be reproduced at every event, for example.

BRIEF DESCRIPTION OF THE DRAWINGS

FIG. 6 shows a diagram depicting exemplary indications on an exemplary subject display screen;

FIG. 9 shows a block diagram depicting an exemplary configuration of a reproducing apparatus 51 to which an embodiment of the invention is adapted;

FIG. 11 shows a diagram depicting exemplary indications on a subject select screen;

DETAILED DESCRIPTION OF THE INVENTION

Hereinafter, an embodiment of the invention will be described. The following is examples of the correspondence between configuration requirements for the invention and the embodiments of the specification or the drawings. This is described for confirming that the embodiments supporting the invention are described in the specification or the drawings. Therefore, even though there is an embodiment that is described in the specification or the drawings but is not described herein as an embodiment corresponding to configuration requirements for the invention, it does not mean that the embodiment does not correspond to those configuration requirements. Contrary to this, even though an embodiment is described herein as an embodiment corresponding to configuration requirements, it does not mean that the embodiment does not correspond to configuration requirements other than those configuration requirements.

An imaging apparatus according to an embodiment of the invention is an imaging apparatus including: an imaging part (for example, an imaging part 11 shown in FIG. 1); and an imaging control means (for example, a control part 17 shown in FIG. 1) for instructing a user to take a predetermined target subject to store a resulted image taken by the imaging part in accordance with the instruction on a recording medium.

Figure 4:
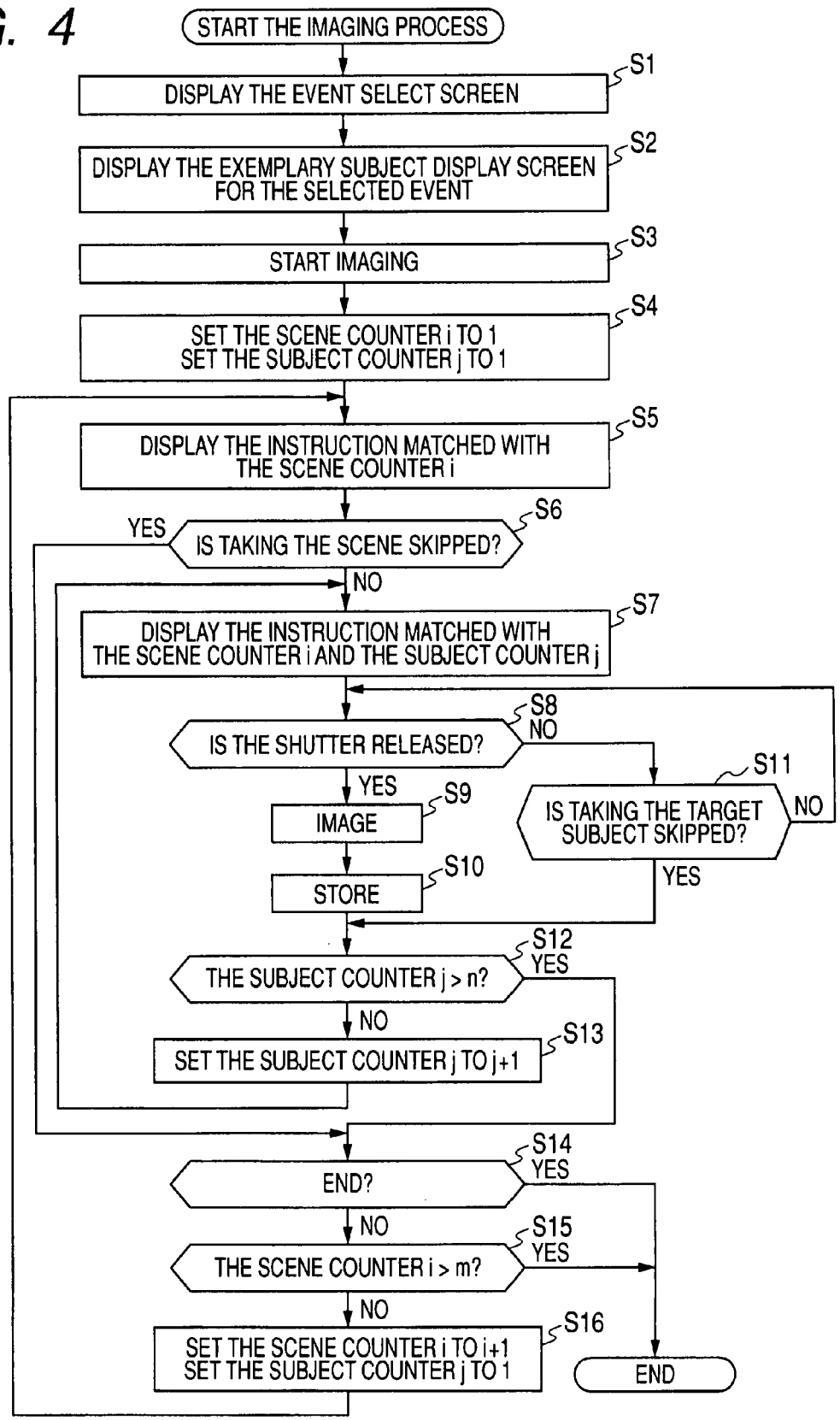
FIG. 4 shows a flow chart illustrative of an imaging process done by the digital camera 1 shown in FIG. 1.

The imaging control means may instruct a user to take a plurality of target subjects in a predetermined order, and store a resulted image taken by the imaging part in accordance with the instruction on a recording medium (for example, FIG. 4).

Figures 2, 3:
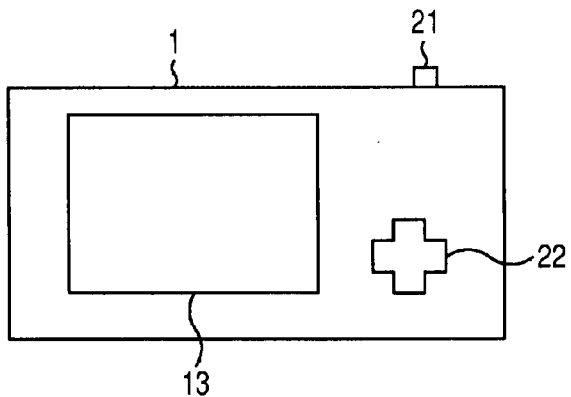
FIG. 2 shows a diagram depicting an exemplary configuration of the appearance of the digital camera 1 shown in FIG. 1.
FIG. 3 shows a diagram illustrative of subjects to be taken by a user.
Figure 5:
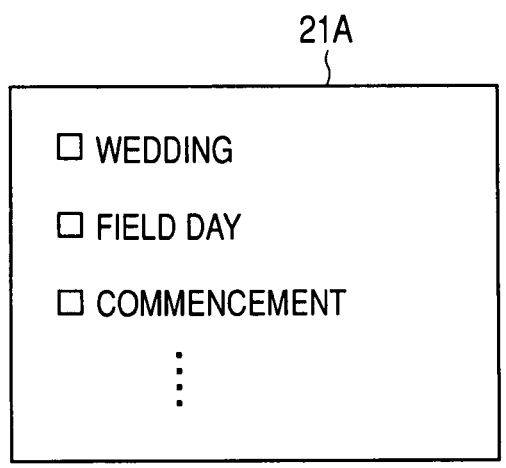
FIG. 5 shows a diagram depicting exemplary indications on an event select screen.

The imaging control means may instruct a user to take a target subject in accordance with an event at every event (for example, FIGS. 3 and 5).

Figure 12:
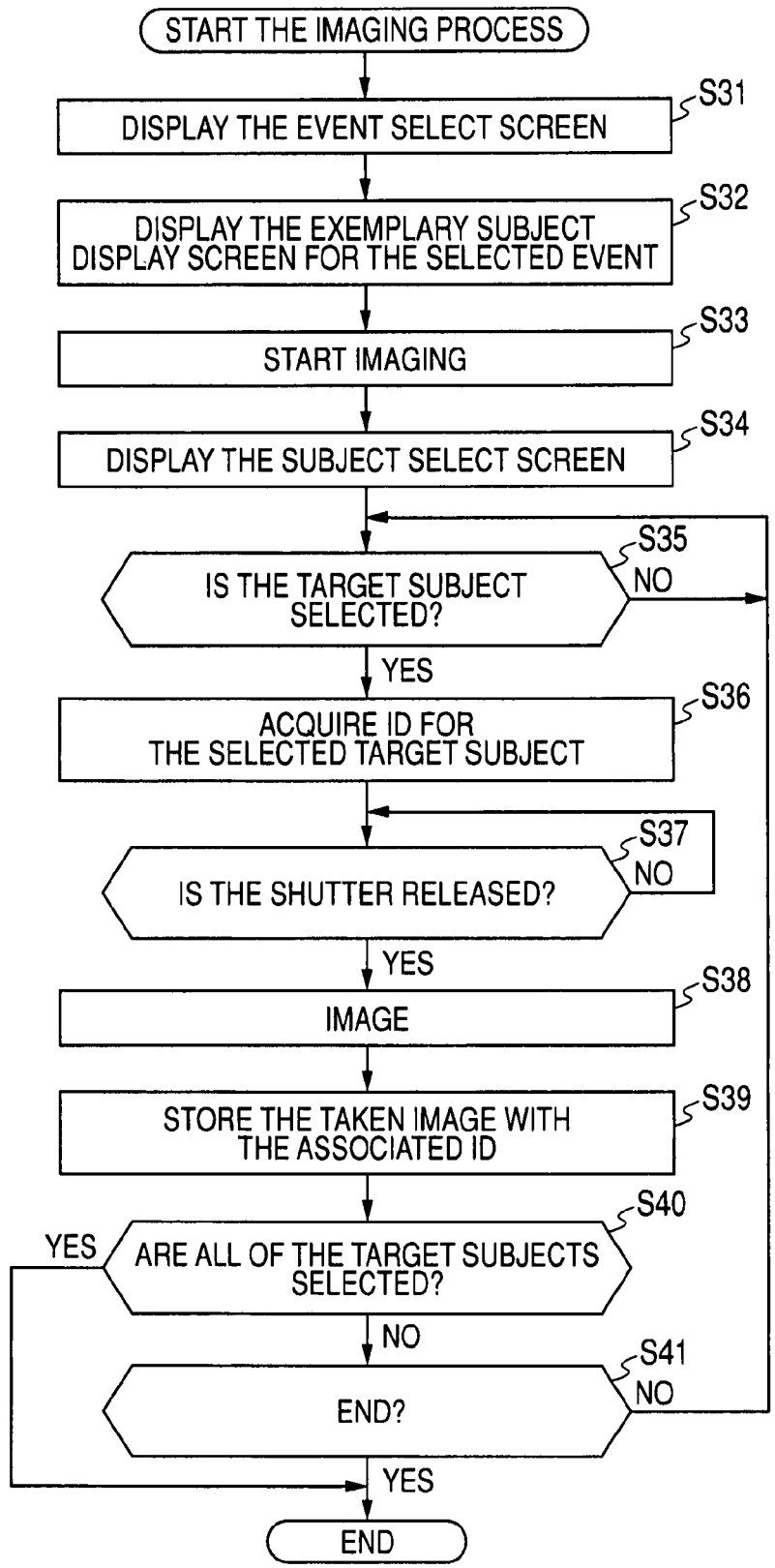
FIG. 12 shows a flow chart illustrative of another imaging process done by the digital camera 1 shown in FIG. 1.

The imaging control means may selectably represent a plurality of target subjects to take (for example, FIG. 11), and when a target subject to take is selected, the imaging control means may store a resulted image taken by the imaging part in accordance with the choice on the recording medium (for example, FIG. 12).

The imaging control means may store the taken image on the recording medium in order of being taken (for example, FIG. 4).

The imaging control means may associate the taken image with identification information of the target subject, and store it on the recording medium (for example, FIG. 12).

An imaging method or a program according to an embodiment of the invention is an imaging method including the step of: controlling imaging in which a user is instructed to take a predetermined target subject to store a resulted image taken by imaging part in accordance with the instruction on a recording medium (for example, FIG. 4).

A reproducing apparatus according to an embodiment of the invention is a reproducing apparatus which reproduces a taken image stored on a recording medium of an imaging apparatus having an imaging part; and an imaging control means for instructing a user to take a predetermined target subject to store a resulted image taken by the imaging part in accordance with the instruction on a recording medium, the reproducing apparatus including: a reproducing means (for example, a control part 61 shown in FIG. 9) for reproducing the taken image stored on the recording medium in order of being stored on the recording medium.

Figure 13:
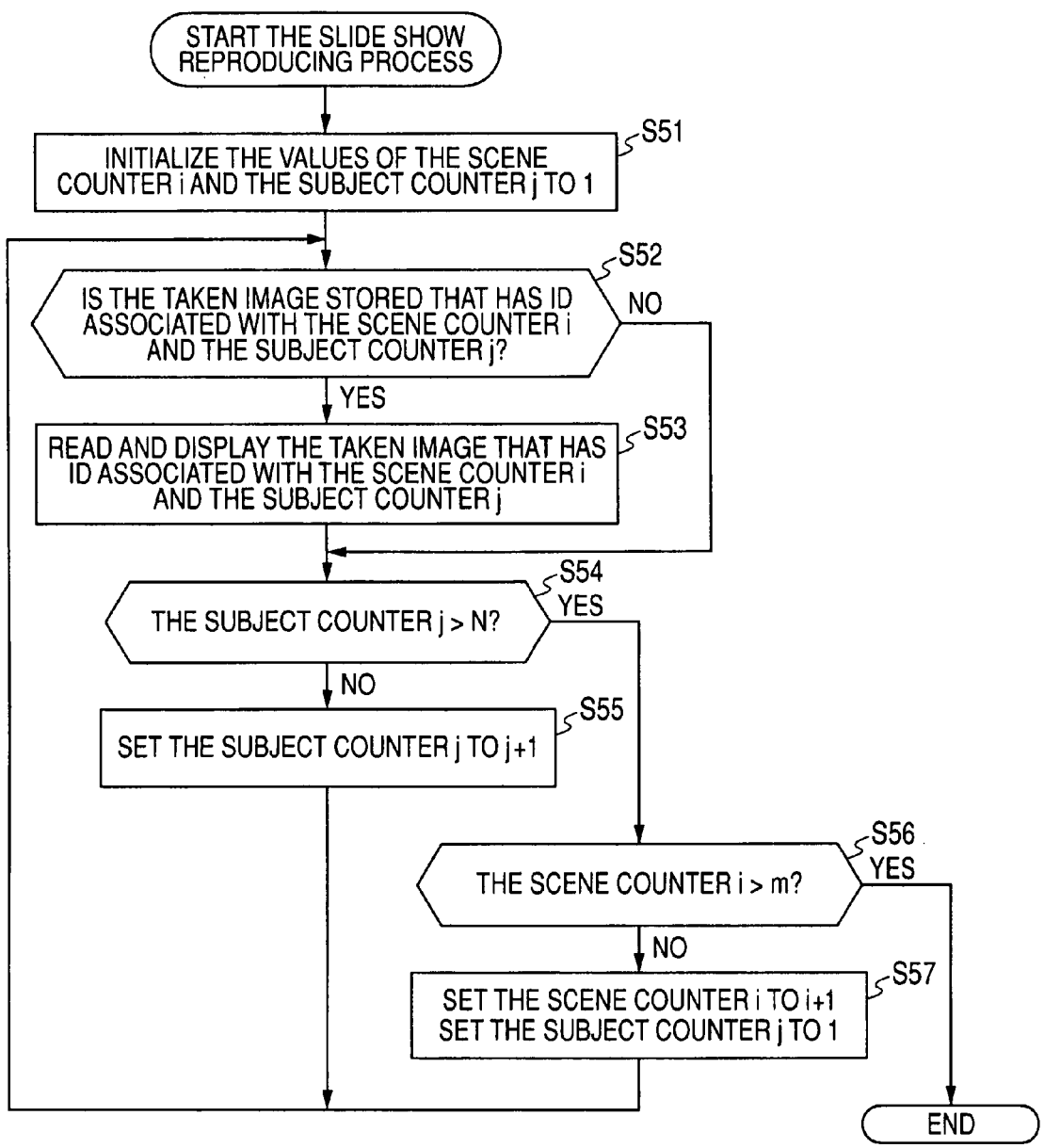
FIG. 13 shows a flow chart illustrative of another slide show reproducing process done by the reproducing apparatus 51 shown in FIG. 9.

In the imaging apparatus, in the case in which the taken image is stored as it is associated with identification information of the target subject, the reproducing means may reproduce the taken image associated with the identification information in order of target subjects identified by the identification information (for example, FIG. 13).

Figure 10:
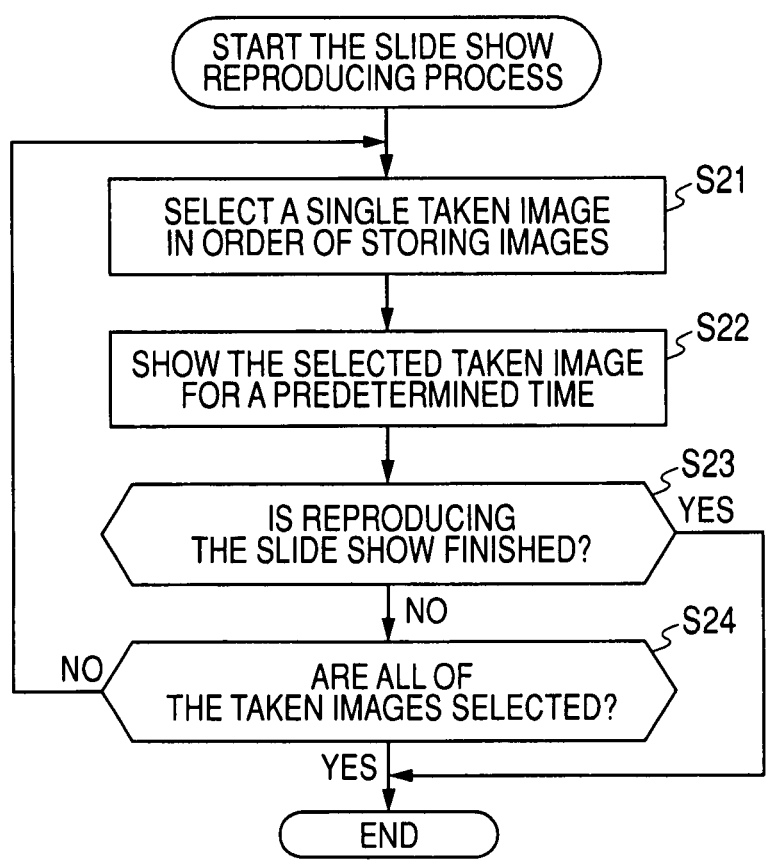
FIG. 10 shows a flow chart illustrative of a slide show reproducing process done by the reproducing apparatus 51 shown in FIG. 9.

A reproducing method or a program according to an embodiment of the invention is a reproducing method of reproducing a taken image stored on a recording medium of an imaging apparatus having an imaging part; and an imaging control means for instructing a user to take a predetermined target subject to store a resulted image taken by the imaging part in accordance with the instruction on a recording medium, the reproducing method including the step of: reproducing the taken image stored on the recording medium in order of being stored on the recording medium (for example, FIG. 10).

Figure 1:
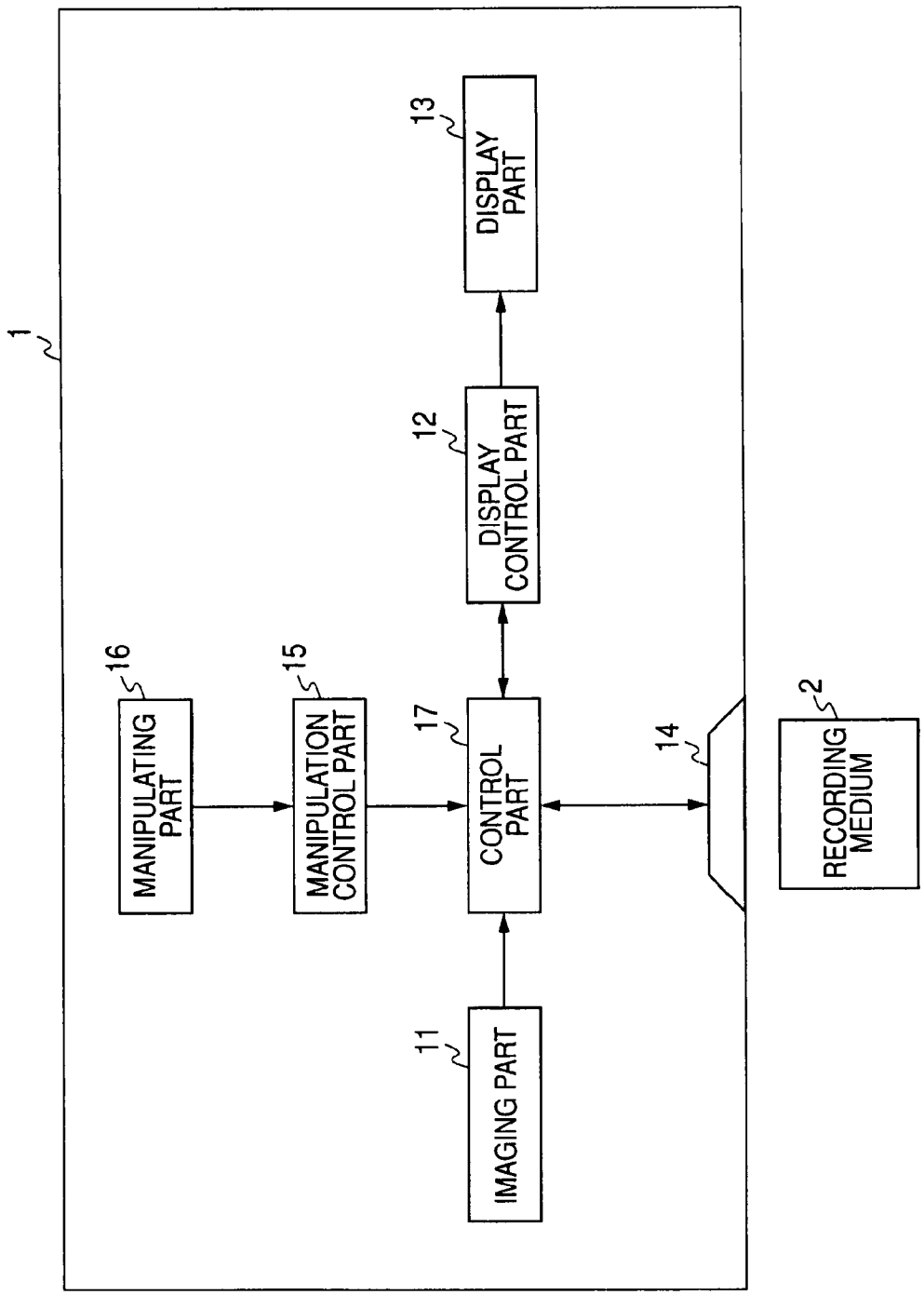
FIG. 1 shows a block diagram depicting an exemplary configuration of a digital camera 1 to which an embodiment of the invention is adapted.

FIG. 1 shows an exemplary configuration of a digital camera 1 to which an embodiment of the invention is adapted.

The imaging part 11 is configured of a CCD camera, which takes scenes and supplies the resulted images to a control part 17.

A display control part 12 displays a predetermined manipulation screen, an image currently being taken by the imaging part 11, or a taken image under control done by a control part 17 on a display part 13 that is provided on the back side of the digital camera 1, as shown in FIG. 2, for example.

Returning to FIG. 1, a slot 14 has a configuration in which a recording medium 2 is detachable, and the taken image supplied from the control part 17 is stored on the recording medium 2 mounted on the slot 14.

A manipulation control part 15 receives the descriptions of user manipulation to a manipulating part 16 configured of a shutter button 21 and a manipulation button 22 provided on the digital camera 1 as shown in FIG. 2, and notifies the control part 17.

The control part 17 controls the individual parts depending on the manipulation descriptions notified from the manipulation control part 15, and allows the parts to perform predetermined imaging processes, for example.

Here, the outline of the imaging process done in the digital camera 1 will be described. In the imaging process, for example, a subject suited to picture an event such as a "wedding", a "field day", and a "commencement" is properly instructed to a user at every event that the user is desired to take images, and the image taken in accordance with the instruction is stored on the recording medium 2.

As described above, a user is instructed to take a subject to shoot at every event, and then the user in turn takes the instructed subjects in accordance with the instructions, whereby images of subjects suited to picture the scenes of the event, that is, images of a sequence of scenes with a plot when reproduced by a slide show can be stored on the recording medium 2. Therefore, the images of scenes suited to picture the scenes of the event can be obtained without editing images afterwards.

For example, in an event "wedding", a user is instructed to take a subject suited to picture a wedding as shown in FIG. 3 (hereinafter, referred to as a target subject W) from above to below in the drawing. In addition, in the example shown in FIG. 3, target subjects W suited to picture a wedding are grouped together at every scene P.

More specifically, as target subjects W that should be taken for a scene "ceremony hall appearance P1" at the first place, chapel W1-1, bell W1-2, virgin road W1-3, flowers inside the chapel W1-4, and so on are in turn instructed.

Subsequently, as target subjects W that should be taken for a scene "bride room P2", bride W2-1, parents W2-2, entire room W2-3, and so on in the bride room are in turn instructed.

Subsequently, as target subjects W that should be taken for a scene "inside ceremony hall P3", bride and groom when enter W3-1, attendees W3-2, tables W3-3, and so on inside the ceremony hall are in turn instructed.

In other words, in this imaging process, a user is properly instructed to take the target subjects W as shown in FIG. 3, for example, depending on the event, as described later. Thus, the user takes subjects in accordance with the instructions, and then the images of the subjects (the scenes) that picture the scenes of a wedding can be in turn stored on the recording medium 2, such as a chapel, a bell, a virgin road, flowers inside the chapel, bride and parents in the bride room, the entire room, bride and groom when enter, attendees, and tables inside the ceremony hall.

Consequently, it is unnecessary to edit images after taken, and a sequence of images with a plot can be obtained at the same time when taking images are finished, for example.

Next, the imaging process will be described with reference to a flow chart shown in FIG. 4.

In Step S1, the control part 17 of the digital camera 1 controls the display control part 12 to display an event select screen 21A to select an event on the display part 13 as shown in FIG. 5.

On the event select screen 21A as shown in FIG. 5, the indications "wedding", "field day", and "commencement" are provided as selectable events.

For example, in FIG. 5, in the case in which a checkbox corresponding to an indication "wedding" is marked to select the event "wedding", the imaging process is performed in which it is properly instructed to take the individual target subjects W described with reference to FIG. 3.

If a predetermined event is selected on the event select screen 21A, in Step S2, the control part 17 controls the display control part 12 to display an exemplary subject display screen 21B as shown in FIG. 6.

The example shown in FIG. 6 is the exemplary subject display screen 21B displayed when the event "wedding" is selected on the event select screen 21A shown in FIG. 5, on which messages indicating the target subjects W shown in FIG. 3 are displayed together. A user references to the exemplary subject display screen 21B to know the subject that should be taken now.

Figure 7:
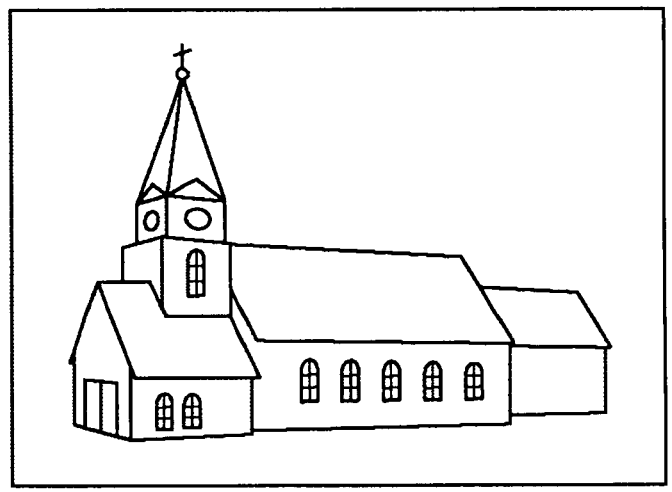
FIG. 7 shows a diagram depicting another exemplary display on the exemplary subject display screen.

In addition, in the example shown in FIG. 6, the message indicating the target subject W is displayed on each of the frames. An image showing the target subject W may be displayed in each of the frames. For example, an image of a chapel may be displayed as shown in FIG. 7 in the frame showing "the chapel" in FIG. 6, and an image of a bell may be displayed in the frame showing "the bell" in FIG. 6, not shown.

Returning to FIG. 4, in Step S3, if the control part 17 is notified from the manipulation control part 15 that the user instructs starting to take images by manipulating the manipulating part 16, in Step S4, the control part 17 initializes the value of a counter indicating the number of of a scene Pi in FIG. 3 (hereinafter, referred to as a scene counter i) to 1, and the value of a counter indicating j of a target subject Wi-j that should be taken in the scene Pi indicated by the scene counter i (hereinafter, referred to as a subject counter j) to 1. In addition, the control part 17 is supposed to have the scene counter i and the subject counter j therein.

In Step S5, the control part 17 controls the display control part 12 to display the instruction corresponding to the value of the scene counter i on the display part 13.

Figure 8A:
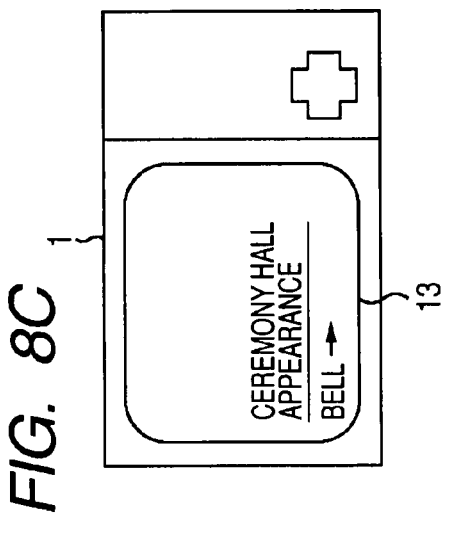
FIGS. 8A to 8F show a diagram depicting exemplary instructions to take target subjects.

In this case, since the value of the scene counter i is 1, as shown in FIG. 8A, a message indicating the scene "ceremony hall appearance P1" to be taken now is displayed on the display part 13. Thus, the user can know that the scene that should be taken now is the appearance of the ceremony hall.

Subsequently, in Step S6, the control part 17 determines whether a notice is made from the manipulation control part 15 that a manipulation is made to skip taking the scene indicated by the message displayed on the display part 13. If the control part 17 determines that the notice is not made, it goes to Step S7.

In Step S7, the control part 17 controls the display control part 12 to display a message corresponding to the value of the scene counter i and the value of the subject counter j on the display part 13.

Figure 8B:
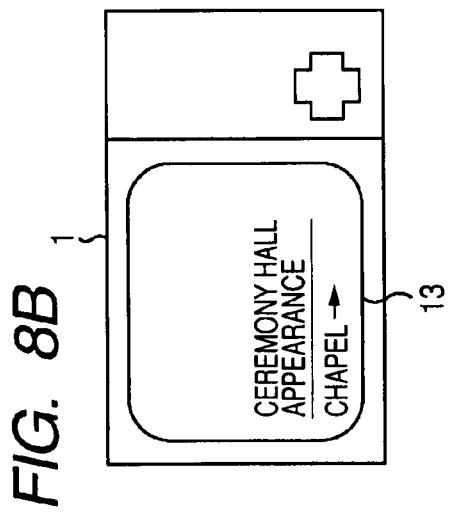
Figure 8C:
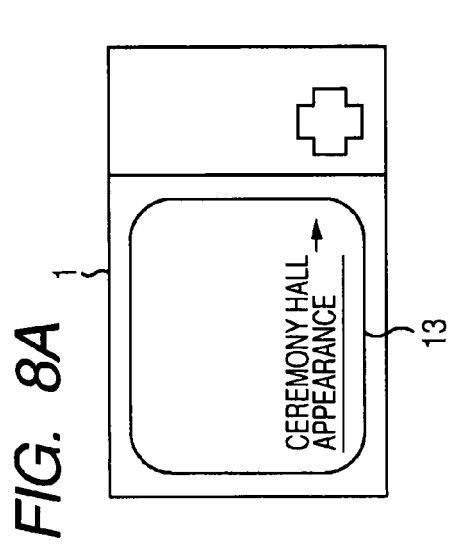
Figure 8D:
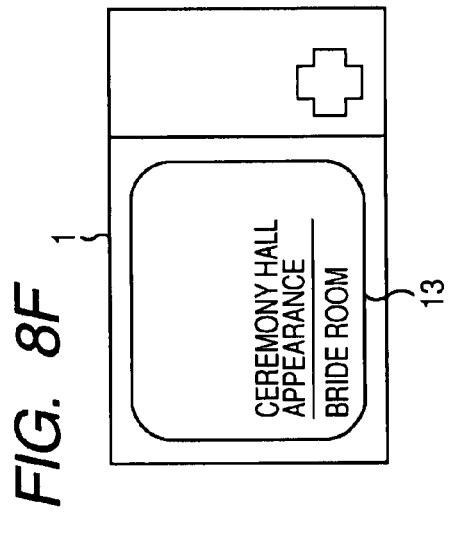
Figure 8E:
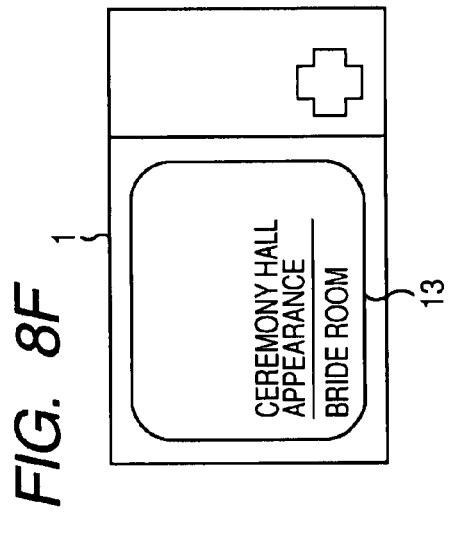
Figure 8F:
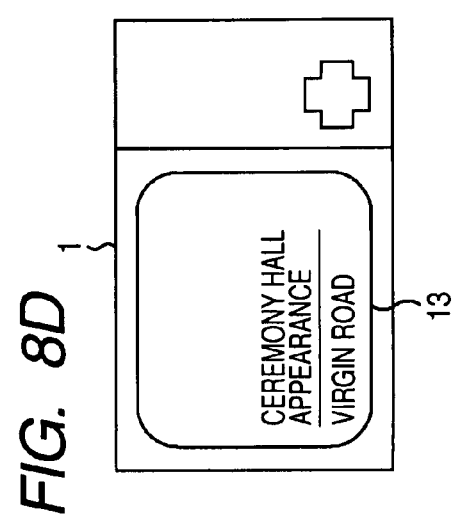

In this case, for example, since the value of the scene counter i is 1 and the value of the subject counter j is 1, as shown in FIG. 8B, a message that instructs taking the chapel W1-1 in the scene "ceremony hall appearance P1" is displayed.

In Step S8, the control part 17 determines whether a notice is made from the manipulation control part 15 that the shutter button 21 is released. If the control part 17 determines that the notice is made, the control part 17 goes to Step S9, it controls the imaging part 11 to start taking the scene as well as in Step S10, it supplies and stores the image supplied from the imaging part 11 (the taken image obtained by taking the scene) on the recording medium 2. More specifically, a user takes the chapel in accordance with the instruction as shown in FIG. 8B, and then the taken image of the chapel is stored on the recording medium 2.

In Step S8, if the control part 17 determines that no notice is made that the shutter button 21 is released, it goes to Step S11. The control part 17 determines whether a notice is made from the manipulation control part 15 that a manipulation is made to skip taking the target subject W indicated by the message displayed on the display part 13. If the control part 17 determines that no notice is made, it returns to Step S8.

In Step S10, at the time when the taken image is stored on the recording medium 2, or in Step S11, if the control part 17 determines that a notice is made that a manipulation is made to skip taking the target subject W, it goes to Step S12.

In Step S12, the control part 17 determines whether the value of the subject counter j is greater than the number n of the target subject W in the scene Pi indicated by the value of the scene counter i. If the control part 17 determines otherwise, the control part 17 goes to Step S13, increments the value of the subject counter j by 1, and returns to Step S7 to similarly perform the process steps after that.

In other words, Step S7 to Step S13 are repeated to display the message that instructs taking the target subject W as shown in FIGS. 8B to 8F on the display part 13, and the images taken in accordance with the instructions are in turn stored on the recording medium 2.

In Step S6, if taking the scene Pi is skipped, or in Step S12, if the control part 17 determines that the subject counter is j>n, it goes to Step S14. The control part 17 determines whether the manipulation control part 15 notifies an instruction to finish the imaging process. If the control part 17 determines that the instruction is not notified, it goes to Step S15.

In Step S15, the control part 17 determines whether the value of the scene counter i is greater than the number m of the scene P. If the control part 17 determines otherwise, it goes to Step S16, increments the value of the scene counter by 1 as well as initializes the value of the subject counter j to 1.

After that, the control part 17 returns to Step S5 to similarly perform the process steps after that.

In Step S14, if the control part 17 determines that an instruction is notified to finish the imaging process, or in Step S15, if the control part 17 determines that the scene counter is i>m (that is, if all the instructions to take the target subjects W are completed), it end the imaging process.

As described above, since a user is properly instructed to take the target subjects W as shown in FIG. 3, for example, depending on the event, the user takes the subjects in accordance with the instructions, whereby the images of the subjects (the scenes) suited to picture the scenes of the event can be stored on the recording medium 2.

In other words, no edits are necessary after finishing taking photos, and at the same time, for example, a sequence of images with a plot can be obtained.

FIG. 9 shows an exemplary configuration of a reproducing apparatus 51 which reproduces images taken by the digital camera 1 and stored on the recording medium 2 shown in FIG. 1.

A control part 61 controls the individual parts in response to the descriptions of user manipulation to a manipulating part, not shown, the descriptions notified from a manipulation control part 65. For example, the control part 61 reads a taken image stored on the recording medium 2 mounted on a slot 62, and controls a display control part 63 to display the taken image on a display part 64.

Next, the operation of the reproducing apparatus 51 in the case in which the taken images stored on the recording medium 2 are reproduced by a slide show will be described with reference to a flow chart shown in FIG. 10.

In Step S21, the control part 61 selects one of taken images in order of being stored on the recording medium 2 and reads it out of the recording medium 2. In Step S22, the control part 61 controls the display control part 63 to display the image on the display part 64 for a predetermined time.

In Step S23, the control part 61 determines whether an instruction is notified to finish reproduction by a slide show from the manipulation control part 65. If the control part 61 determines that the instruction is not made, the control part 61 goes to Step S24.

In Step S24, the control part 61 determines whether all the taken images stored on the recording medium 2 are selected in Step S21. If the control part 61 determines that there are taken images not selected yet, the control part 61 returns to Step S21, selects and reads the subsequent taken image out of the recording medium 2, and similarly performs the process steps after Step S22.

In Step S24, if the control part 61 determines that all the taken images stored on the recording medium 2 are selected, or in Step S23, if it determines that an instruction is notified to finish reproduction by a slide show, the control part 61 ends the process.

In other words, as discussed above with reference to FIG. 4, since the taken images of the target subjects W picturing the scenes of the event are stored on the recording medium 2 in a predetermined order, the taken images are reproduced in order of being thus stored on the recording medium 2 to reproduce a sequence of the images with a plot, for example by a slide show.

For instance, in the case in which the taken images obtained in accordance with the instructions to take the target subjects W shown in FIG. 3 are stored on the recording medium 2, first, the image of the chapel stored at the first place is read out of the recording medium 2 and displayed for a predetermined time, and then instead of the taken image of the chapel, the taken image of the bell is read out of the recording medium 2 and the taken image of a predetermined bell is displayed for a predetermined time. As discussed above, a sequence of the images picturing a wedding is reproduced by a slide show.

In addition, in the imaging process shown in FIG. 4, the taken images of the target subjects W shown in FIG. 3 are stored on the recording medium 2 in order of taking the images, but it is sometimes difficult to take the target subjects W in order shown in FIG. 3.

Then, as shown in FIG. 11, for example, a subject select screen 21C that shows the target subjects W of the event "wedding" and can select the subject is displayed on the display part 13 of the digital camera 1, and a user can decide and take the target subject W to shoot while the user sees the indications.

An imaging process done by the digital camera 1 in this case will be described with reference to a flow chart shown in FIG. 12.

The similar process steps as those in Step S1 to Step S3 shown in FIG. 4 are performed in Step S31 to Step S33, omitting the descriptions.

In Step S34, the control part 17 of the digital camera 1 controls the display control part 12 to display the subject select screen 21C as shown in FIG. 11.

In Step S35, the control part 17 determines whether a target subject W is selected on the subject select screen 21C. If the control part 17 determines that the subject is selected, it goes to Step S36, and configures the ID of the selected target subject W from the number of the selected target subject W and the number of the scene P to which the target subject W belongs.

In addition, the number of the scene P is the number corresponding to the portion i of the scene Pi shown in FIG. 3, and the number of the target subject W is the number corresponding to the portion j of the target subject Wi-j shown in FIG. 3. The control part 17 is supposed to store the numbers.

Subsequently, in Step S37, the control part 17 determines whether the shutter button 21 is released. If the control part 17 determines that the shutter button 21 is released, it goes to Step S38, and controls the imaging part 11 to take the subject as well as in Step S39, it stores the taken image thus obtained on the recording medium 2.

In addition, in this case, in storing the taken image on the recording medium 2, it is supposed that images are stored so as to be arranged in order of the IDs of the target subjects W. More specifically, the taken images are stored in a predetermined storage area of the recording medium 2 in order of subjects shown in FIG. 3.

In Step S40, the control part 17 determines whether all the target subjects W are selected in Step S35. If the control part 17 determines that there are target subjects W not selected yet, it goes to Step S41.

In Step S41, the control part 17 determines whether an instruction is made to finish the imaging process. If the control part 17 determines that the instruction is not notified, it returns to Step S35 to perform the process after that.

In Step S40, if the control part 17 determines that all the target subjects W are selected, or in Step S41, it determines that an instruction is made to finish the imaging process, the control part 17 ends the imaging process.

In addition, the taken images thus stored on the recording medium 2 can be basically similarly reproduced by a slide show as the process shown in FIG. 10. However, in this case, in the process step corresponding to Step S21, the taken images are in turn selected from the beginning (that is, the order of the IDs of the target subjects W).

As described above, the target subjects W that should be taken in a predetermined scene are selectably represented to allow a user to take images while the user selects the target subject W. Therefore, even though it is difficult to take the target subjects W in order shown in FIG. 3, the target subjects W suited to picture the event can be taken.

In addition, in the exemplary imaging process shown in FIG. 12, the taken images of the target subjects W are written on the recording medium 2 so as to be arranged in order of the IDs of the target subjects W, but the images may be written at given positions. In this case, in the digital camera 1, in storing the taken images on the recording medium 2, the taken image to be stored is associated with the ID of the target subject W currently selected. In this case, in the reproducing apparatus 51, the order to be reproduced is decided based on the ID.

As described above, a slide show reproducing process in the reproducing apparatus 51 in the case in which the taken images are associated with the IDs of the target subjects W and stored on the recording medium 2 will be described with reference to a flow chart shown in FIG. 13.

In Step S51, the control part 61 initializes the values of the scene counter i indicating the scene P and the subject counter j indicating the target subject W to 1.

In Step S52, the control part 61 determines whether a taken image associated with an ID formed of the value of the scene counter i and the value of the subject counter j is stored on the recording medium 2. If the control part 61 determines that the image is stored, it goes to Step S53, reads the taken image out of the recording medium 2, and controls the display control part 63 to display the taken image on the display part 64 for a predetermined time.

In Step S54, the control part 61 determines whether the value of the subject counter j is greater than the number n of the target subject W belonging to the scene Pi indicated by the value of the scene counter i. If the control part 61 determines that the value is not greater than that number, it goes to Step S55, increments the value of the subject counter j by 1, and returns to Step S52 to similarly perform the process steps after that.

In Step S54, if the control part 61 determines that the subject counter is j>n, it goes to Step S56. The control part 61 determines whether the value of the scene counter i is greater than the number m of the scene P. If the control part 61 determines that the value is not greater than that number, it goes to Step S57, increments the value of the scene counter i by 1, and initializes the value of the subject counter j to 1.

After that, the control part 61 returns to Step S52 to similarly perform the process steps after that.

In Step S56, if the control part 61 determines that the scene counter is i>m, the control part 61 ends the process.

As discussed above, reproduction by a slide show is performed.

Next, a series of the process steps described above may be performed by hardware or may be by software. In the case in which a series of the process steps is performed by software, a program configuring the software is installed in a multipurpose computer.

Figure 14:
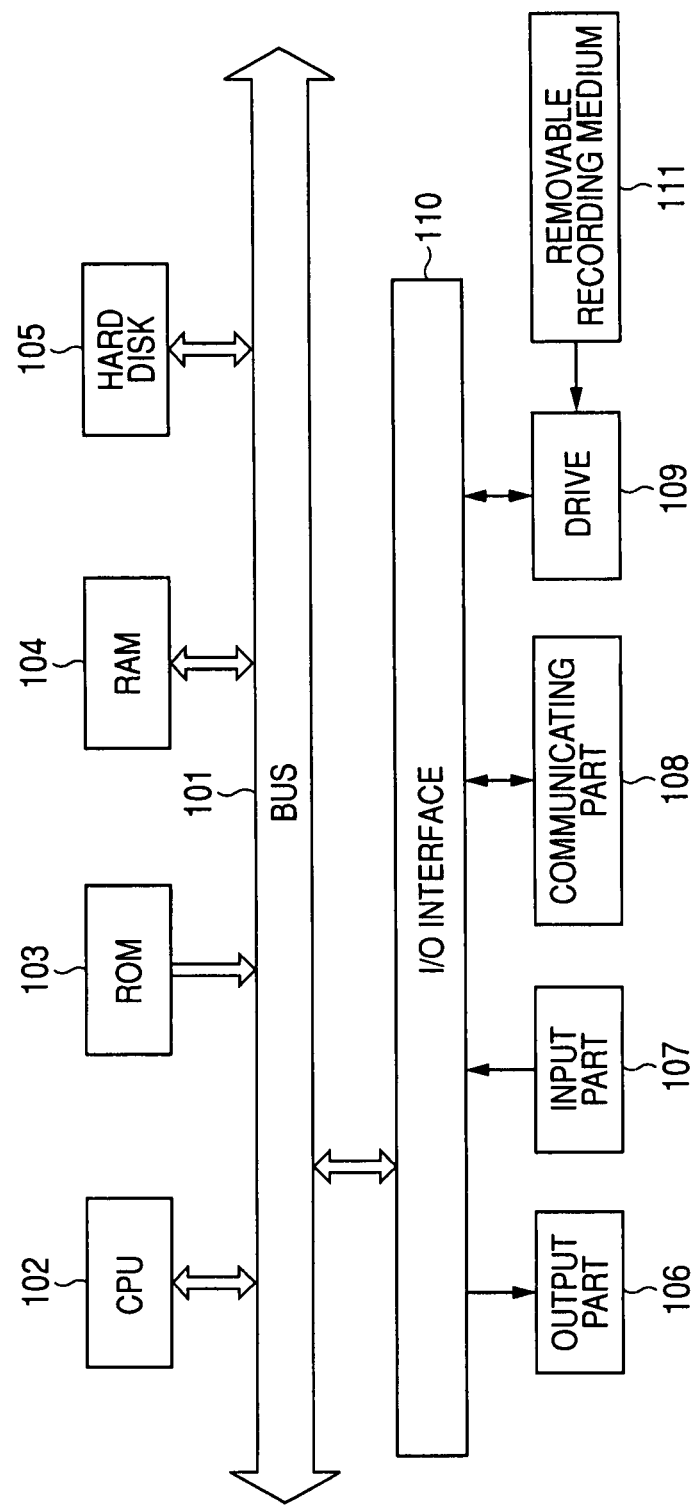
FIG. 14 shows a block diagram depicting an exemplary configuration of a computer to which an embodiment of the invention is adapted.

Then, FIG. 14 shows an exemplary configuration of an embodiment of a computer in which a program executing a sequence of the process steps described above is installed.

The program can be recorded in advance on a hard disk 105 or a ROM 103 incorporated in the computer as a recording medium.

Alternatively, the program can be temporarily or permanently stored (recorded) on a removable recording medium 111 such as a flexible disc, a CD-ROM (Compact Disc Read Only Memory), an MO (Magneto-optical) disc, a DVD (Digital Versatile Disc), a magnetic disc, and a semiconductor memory. The removable recording medium 111 like this can be provided as so-called package software.

Moreover, the program is installed into the computer through the removable recording medium 111 as described above, as well as it can be installed into the hard disk 105 incorporated in the computer from a download site through an artificial satellite for digital satellite broadcast over radio transmission, or installed into the computer through a network such as a LAN (Local Area Network) and the Internet over cable transmission, by receiving the program thus transmitted by a communicating part 108 in the computer.

The computer has a CPU (Central Processing Unit) 102 therein. To the CPU 102, an I/O interface 110 is connected through a bus 101. When a user manipulates an input part 107 configured of a keyboard, a mouse, a microphone, etc., to enter an instruction to the CPU 102 through the I/O interface 110, it runs the program stored in the ROM (Read Only Memory) 103. Alternatively, the CPU 102 loads into a RAM (Random Access Memory) 104 the program that is stored in the hard disk 105, the program that is transmitted through a satellite or a network, received at the communicating part 108, and installed in the hard disk 105, or the program that is read out of the removable recording medium 111 mounted on a drive 109 and installed into the hard disk 105 for implementation. Thus, the CPU 102 performs the process steps in accordance with the flow charts described above, or runs the process steps performed by the configurations in the block diagrams shown. Then, the CPU 102 outputs the process results from an output part 106 configured of an LCD (Liquid Crystal Display) and a speaker through the I/O interface 110, etc., as necessary, or transmits the process results from the communicating part 108, or further records the process results on the hard disk 105.

Here, in the specification, the process steps describing the program to allow the computer to run various processes are not necessarily performed in time series along the order described in flow charts, which include the process steps performed in parallel or separately (for example, parallel processing or processing by an object).

In addition, the program may be processed in a single computer, or may be processed by a plurality of computers in distributed processing. Furthermore, the program may be forwarded to a remote computer for implementation.

Moreover, an embodiment of the invention is not limited to the embodiments described above, which can be modified within the scope not deviating from the teaching of an embodiment of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
a manipulation control part;
a shutter;
an imaging part; and
an imaging control unit configured to provide a set of instructions to prompt a user to initiate capture, by the imaging part, of a plurality of target subjects in a predetermined order for storage of captured images of the plurality of target subjects on a recording medium, each of the plurality of target subjects respectively being associated with an event,
wherein the imaging control unit associates and stores each captured image with unique identification information that is generated automatically from the predetermined order,
the imaging control unit automatically increments through the predetermined order of the plurality of target subjects when the imaging control unit receives a notice that is automatically generated by the manipulation control part in response the shutter being released,
the predetermined order includes a set of scene counters and a plurality of subject counter sets associated with each scene counter,
the unique identification information is a number generated from a combination of a scene counter from the set of scene counters and a subject counter from the subject counter set in association with the scene counter.

2. The apparatus of claim 1, wherein automatically incrementing through the predetermined order by the imaging control unit includes in order:
setting a subject counter to 'j', where 'j' is a whole number;
setting a scene counter to 'i', where 'i' is a whole number;
positively incrementing the subject counter when the notice is received by the imaging control unit; and
positively incrementing the scene counter if the subject counter is greater than 'n' and then resetting the scene counter, where 'n' is a whole number designating a total number of subjects.

3. A method, comprising:
providing, by an imaging control unit, a set of instructions to prompt a user to initiate capture, by an imaging part, of a plurality of target subjects in a predetermined order for storage of captured images of the plurality of target subjects on a recording medium, each of the plurality of target subjects respectively being associated with an event,
associating and storing, by the imaging control unit, each captured image with unique identification information that is generated automatically from the predetermined order,
wherein the imaging control unit automatically increments through the predetermined order of the plurality of target subjects when the imaging control unit receives a notice that is automatically generated by a manipulation control part in response a shutter being released,
the predetermined order includes a set of scene counters and a plurality of subject counter sets associated with each scene counter, and
the unique identification information is a number generated from a combination of a scene counter from the set of scene counters and a subject counter from the subject counter set in association with the scene counter.

4. The method of claim 3, wherein automatically incrementing through the predetermined order by the imaging control unit includes in order:
setting a subject counter to 'j', where 'j' is a whole number;
setting a scene counter to 'i', where 'i' is a whole number;
positively incrementing the subject counter when the notice is received by the imaging control unit; and
positively incrementing the scene counter if the subject counter is greater than 'n' and then resetting the scene counter, where 'n' is a whole number designating a total number of subjects.

5. A non-transitory computer readable medium storing program code, the program code being executable by a processor to perform operations comprising:
providing, by an imaging control unit, a set of instructions to prompt a user to initiate capture, by an imaging part, of a plurality of target subjects in a predetermined order for storage of captured images of the plurality of target subjects on a recording medium, each of the plurality of target subjects respectively being associated with an event, associating and storing, by the imaging control unit, each captured image with unique identification information that is generated automatically from the predetermined order, wherein the imaging control unit automatically increments through the predetermined order of the plurality of target subjects when the imaging control unit receives a notice that is automatically generated by a manipulation control part in response a shutter being released, the predetermined order includes a set of scene counters and a plurality of subject counter sets associated with each scene counter, and the unique identification information is a number generated from a combination of a scene counter from the set of scene counters and a subject counter from the subject counter set associated with the scene counter.

6. The computer readable medium of claim 5, wherein automatically incrementing through the predetermined order by the imaging control unit includes in order:

setting a subject counter to 'j', where 'j' is a whole number;
setting a scene counter to 'i', where 'i' is a whole number;
positively incrementing the subject counter when the notice is received by the imaging control unit; and
positively incrementing the scene counter if the subject counter is greater than 'n' and then resetting the scene counter, where 'n' is a whole number designating a total number of subjects.

\* \* \* \* \*